Aug. 26, 1958  F. ABEL  2,848,859
LAWN MOWER WITH ADJUSTABLE WHEEL MOUNTING ASSEMBLY
Filed April 3, 1957  2 Sheets-Sheet 1
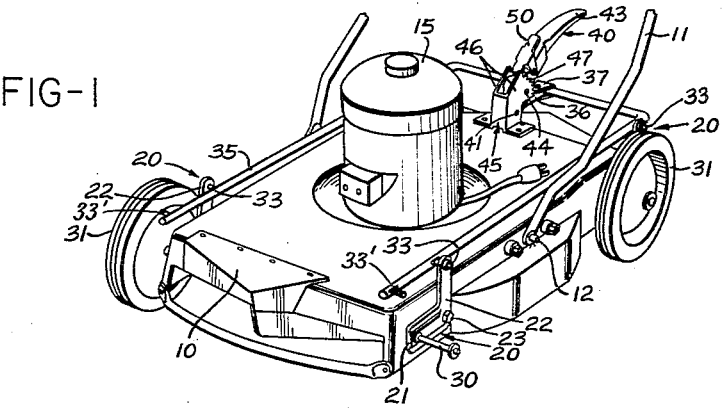
INVENTOR.
FREDERICK ABEL
BY
Marechal, Biebel, French & Berg
ATTORNEYS

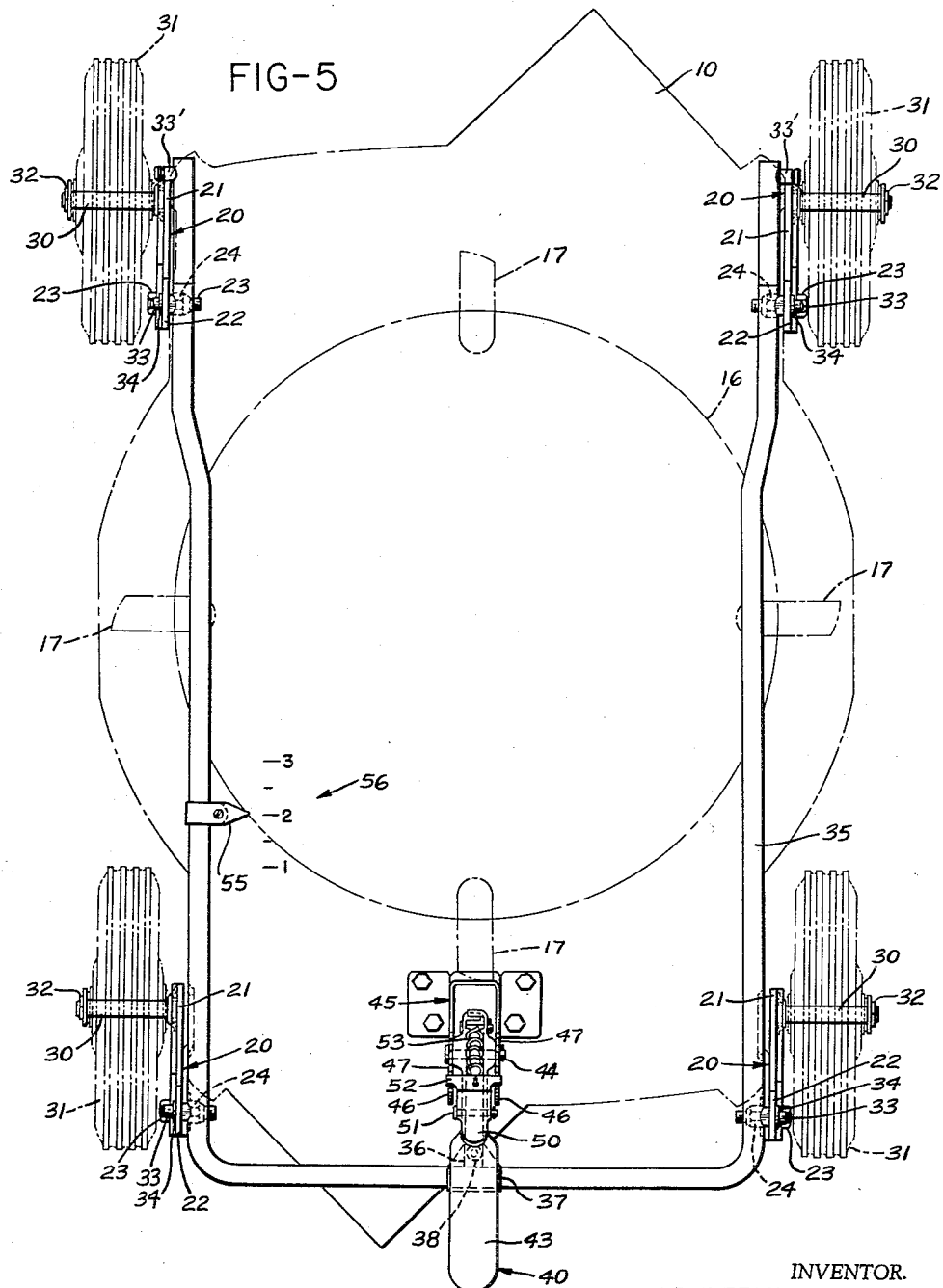

United States Patent Office 2,848,859
Patented Aug. 26, 1958

2,848,859

LAWN MOWER WITH ADJUSTABLE WHEEL MOUNTING ASSEMBLY

Frederick Abel, Dayton, Ohio, assignor to The Huffman Manufacturing Company, Dayton, Ohio, a corporation of Ohio Application April 3, 1957, Serial No. 650,414

10 Claims. (Cl. 56—25.4)

This invention relates to power lawn mowers of the rotary type, and more particularly to a suspension system for such mowers for varying the cutting height thereof.

It is an object of this invention to provide a suspension system for a rotary lawn mower wherein a single operating handle will effectuate simultaneous operation of the suspension system components.

Another object of this invention is the provision of a suspension system for a rotary lawn mower wherein a substantially constant force may be applied against the operating handle to effect adjustment of the suspension system at any point within its adjustable range.

Still another object of the present invention is the provision of a simple and economically constructed suspension system for a rotary lawn mower which will require minimum upkeep and maintenance.

Other objects and advantages of the present invention will be in part obvious and in part explained by reference to the accompanying specification, the accompanying drawings and the appended claims.

In the drawings:

Fig. 1 is a perspective view of a power driven lawn mower having an adjustable suspension system in accordance with the present invention and showing one front wheel removed to illustrate its supporting linkage;

Fig. 2 is a fragmentary side elevational view showing the components making up the suspension system and with some parts shown in phantom outline;

Fig. 3 is a diagrammatic view showing two positions of certain of the moving parts of the suspension system;

Fig. 4 is an elevational view with parts broken away and shown in section of certain of the suspension system components shown in Fig. 2; and Fig. 5 is a top plan view further illustrating the manner in which the body of the mower is attached to the wheels and with the wheels themselves in phantom outline for clarity of illustration.

Referring to the drawings, which illustrate a preferred embodiment of the invention, the lawn mower includes a main body casing 10 having an upwardly extending handle 11 pivotally attached to either side thereof as indicated at 12. Also mounted on casing 10 is a motor 15 having a shaft extending vertically downwardly to drive cutting means comprising a disk shaped carrier plate 16 which has a plurality of cutting blades 17 pivotally secured thereto.

A plurality of bell crank levers 20 comprising generally horizontally extending legs 21 and generally vertically extending legs 22 are pivotally attached at their fulcrums to opposite sides of body 10, adjacent the ends thereof, by means of bolts 23 and nuts 24. The two levers 20 adjacent the rear end of body 10 are attached to the body through extension plates 25 which are riveted or otherwise suitably attached to the body 10, as indicated at 26, and extend rearwardly a short distance therebeyond.

A plurality of stub axles 30 extend outwardly from the outer ends of horizontal legs 21 of bell crank levers 20 to provide mounting means for wheels 31, the wheels being retained on the shafts by cotter pins 32 which extend transversely through axles 30. The vertical legs 22 of levers 20 are all pivotally connected by studs 33 to a single U-shaped connecting member or yoke 35 in order that all may be operated simultaneously by movement of member 35 generally lengthwise of the mower body. A simple construction of adequate strength is produced by welding the studs 33 on yoke 35 and securing the levers 20 thereto by a convenient fastener such as a pin or C-clip 34. The U-shaped yoke member 35, which interconnects all of the bell crank levers 20 to act as a gang operator, is in turn joined to its operating mechanism by a short, longitudinally extending connecting link 36 which is connected at one end to yoke 35 by a strap 37 and a strap retaining pin 38 extending through the strap 37 and link 36 as shown in Fig. 4.

Operation of levers 20 through members 35 and 36 is effected by means of a generally bell crank shaped operating lever 40 which has its lower end portion 42 pivotally connected by a transversely extending pin 41 with the forward end of link 36 so that pressure exerted against its enlarged upper end 43 will ultimately be transmitted to the levers 20. The lever 40 is mounted for pivoting movement on a pin 44 which is carried by a stop bracket 45, the pin 44 extending transversely between a pair of upwardly and rearwardly extending bracket arms 46. These arms are constructed with arcuately shaped serrated upper edges 47 designed to cooperate with a releasable catch or thumb lever 50 which pivots about a pin 51 on lever 40. The tab portion 52 of catch 50 is held in releasable engagement with serrated edges 47 by a spring 53, this spring joining the tab to the lever as illustrated.

Fig. 3 illustrates diagrammatically the mode of operation which results from this structural arrangement. Whenever the catch 50 is released, gravity and the weight of the body and motor tend to cause all of the bell crank levers 20 to pivot about the wheel axles 30 in counterclockwise direction as viewed in Fig. 3 and thereby to move the plane of the cutters 17 to its lowermost position. This in turn also causes rotation of the levers 20 with respect to the mower body and thus moves the yoke 35 rearwardly of the body, i. e., to the left as viewed in Fig. 3, and this movement of yoke 35 is transmitted through the link 36 into upward rotational movement of handle 40, in clockwise direction as viewed in Fig. 3.

It follows that whenever the operator desires to change the vertical position of cutters 17, it is merely necessary for him to release catch 50 and then either to depress the handle 40 or to permit it to rise, depending upon whether the cutting plane is to be raised or lowered. In other words, the operator is never required to exert other than a downward force, which is either just enough less than sufficient to counterbalance gravity to allow controlled lowering of the mower body with respect to the wheel axles, or is enough to raise the body against gravity. In either case, application of force by the operator is in the most convenient direction, and in fact the force may readily be applied by the operator's foot, and also the mechanical advantage through the system of links and levers is so high that the actual force to be exerted by the operator is slight and at most a small fraction of the total weight of the mower. In addition, with the bracket 45 and lever 44 located centrally of the body as shown, the force is transmitted equally to both sides of the body for assured ease of operation.

The serrations 47 in the bracket arms 46 are graduated for cooperation with catch 50 to establish a corresponding plurality of adjusted positions for the cutting plane separated by convenient small increments such as one-quarter inch. In addition, the construction of the invention facilitates the provision of a visual indicator of the adjusted position of the mower, comprising a pointer 55 secured on one side of the yoke 35 and a complementary scale 56 on the top of the mower body. Since movement of the yoke 35 is primarily lengthwise of the body, this arrangement is adequately accurate, and preferably the scale is graduated to read directly the effective cutting height of the cutters 17.

Provision is also made for limiting movement of the mower body in each direction, for safety purposes. Referring to Fig. 2, an abutment 57 is provided at the upper end of one or both of the bracket arms 46 which serves as a stop for engagement with the catch tab 52 to limit downward movement of the mower body. Upward movement of the body is limited by the construction of the handle 40 which causes it to abut the mower body itself at its limit of downward movement and thus to limit upward movement of the body with respect to the wheel axis. Note also that the catch tab 52 is proportioned to extend in locked position essentially radially of the pivot pin 44 and essentially tangentially of the pivot pin 51. This arrangement minimizes the possibility of accidental disengagement of the catch against the spring 53, and preferably the catch tab and also the serration 47 are hardened to prevent possible bending thereof in use.

It has been found desirable under some conditions of operation to tilt the body of the mower upwardly toward the front, particularly for uses such as cutting tall grass or weeds and mulching leaves. The invention provides for such adjustment of the motor by means of a pair of selectively usable studs 33' located on the yoke member 35 upwardly of the front pair of studs 33 to which the bell cranks 20 are shown connected. With this arrangement, when the forward pair of bell cranks is transferred from studs 33 to studs 33', the result will be to raise the front end of the motor body with respect to the rear, which is preferably in its lowest setting obtainable by adjustment of the lever 40. Satisfactory results have been obtained with the studs 33' spaced approximately 3 inches forward of the front pair of studs 33, since for normal operation the latter are spaced from the rear pair of studs 33 by the same distance as the corresponding spacing for the fulcrum pivot bolts 23.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. In a rotary lawn mower including cutting means supported in a main body casing for rotation on a substantially vertical axis, the combination of a plurality of bell cranks pivoted on said body and each including two arms, a wheel rotatably mounted on one arm of each of said bell cranks, a single connecting member pivotally connected to the other arm of each of said bell cranks, an operating lever pivoted on said body and having a connection with said connecting member to cause movement thereof generally parallel with said body in response to pivotal movement of said lever with resulting pivoting movement of said bell cranks about the axes of said wheels and generally vertical movement of said body with respect to said wheels, said connection between said lever and said operating member being located substantially centrally of said body for even transmission of force from said lever to both sides of said body, and means on said body for locking said lever in a plurality of selected positions thereof.

2. In a rotary lawn mower including cutting means supported in a body casing for rotation on a substantially vertical axis, the combination of a plurality of bell cranks pivoted on said body and each including two arms, a wheel rotatably mounted on one arm of each of said bell cranks, a single connecting member pivotally connected to the other arm of each of said bell cranks, a stop bracket mounted on said body and having an arcuately shaped serrated upper edge, a bell crank shaped operating lever pivoted on said stop bracket, a link pivotally joining one end of said lever to said single connecting member to cause movement thereof generally parallel with said body in response to pivotal movement of said lever with resulting pivoting movement of said bell cranks about the axes of said wheels and generally vertical movement of said body with respect to said wheels, said lever and said link being located substantially centrally of said body for even transmission of force from said lever to both sides of said body, and means carried by said lever for engaging said serrated edge for locking said lever in a plurality of selected positions thereof.

3. In a rotary lawn mower including cutting means supported in a main body casing for rotation on a substantially vertical axis, the combination of a plurality of bell cranks pivoted on said body and each including two arms, a wheel rotatably mounted on one arm of each of said bell cranks, a single connecting member pivotally connected to the other arm of each of said bell cranks, an operating lever pivoted on said body and having an upper end spaced from the pivot axis thereof and extending generally rearwardly of said body, means connecting the lower end of said lever to said connecting member to cause pivoting movement of said bell cranks about the axes of said wheels and generally upward and downward movement of said body with respect to said wheels in response to downward and upward movement respectively of said operating lever, said lever and said connecting means being located substantially centrally of said body for even transmission of force from said lever to all of said bell cranks, and means on said body for locking said operating lever in a plurality of selected positions thereof.

4. In a rotary lawn mower including cutting means supported in a body casing for rotation on a substantially vertical axis, the combination of a plurality of bell cranks pivoted on said body and each including two arms, a wheel rotatably mounted on one arm of each of said bell cranks, a single connecting member pivotally connected to the other arm of each of said bell cranks, a stop bracket mounted on said body and having a pair of laterally spaced upwardly extending arms with arcuately shaped serrated upper edges, an operating lever pivotally mounted on said stop bracket between said upwardly extending arms, a link pivotally joining one end of said lever to said single connecting member to cause movement thereof generally parallel with said body in response to pivotal movement of said lever with resulting pivoting movement of said bell cranks about the axes of said wheels and generally vertical movement of said body with respect to said wheels, said lever and said link being located substantially centrally of said body for even transmission of force from said lever to both sides of said body, a locking member pivotally mounted on said operating lever and having means for engaging said serrated edges to lock said lever in a plurality of selected positions thereof, and means on said bracket limiting movement of said operating lever in both directions to establish limits for the vertical movements of said body.

5. In a rotary lawn mower including cutting means supported in a body casing for rotation on a substantially vertical axis, the combination of a plurality of bell cranks pivoted on said body and each including two arms, a wheel rotatably mounted on one arm of each of said bell cranks, a single connecting member pivotally connected to the other arm of each of said bell cranks, a stop bracket mounted on said body and having an arcuately shaped serrated upper edge, a bell crank shaped operating lever pivoted on said stop bracket, means joining one end of said lever to said single connecting member to cause movement thereof generally parallel with said body in response to pivotal movement of said lever with resulting pivoting movement of said bell cranks about the axes of said wheels and generally vertical adjusting movement of said body with respect to said wheels, means on said lever for engaging said serrated edge for locking said lever in a plurality of selected positions thereof establishing a corresponding plurality of adjusted positions of said body, and cooperating scale and pointer means one on said body and the other on said connecting member for indicating the vertical position of said cutting means in each said adjusted position of said body.

6. In a rotary lawn mower including cutting means supported in a main body casing for rotation on a substantially vertical axis, the combination of a pair of front wheels and a pair of rear wheels for said body, a bell crank for each of said wheels including a fulcrum and a pair of arms, means rotatably mounting each wheel on one arm of its associated said bell crank, means pivoting the fulcrum of each said bell crank on said body, a single connecting member for said bell cranks, means forming pivotal connections between the other arms of said bell cranks and said connecting member at the same relative spacings lengthwise of said connecting member as the corresponding spacings of said fulcrums, an adjustable connection between said connecting member and said body for causing movement of said member generally lengthwise of said body with resulting pivoting movement of said bell cranks about the axes of said wheels and generally vertical movement of said body with respect to said wheels, and means on said body for locking said connecting member in a plurality of selected positions thereof establishing a corresponding plurality of vertically adjusted positions of said cutting means with respect to the ground level.

7. In a rotary lawn mower including cutting means supported in a main body casing for rotation on a substantially vertical axis, the combination of a pair of front wheels and a pair of rear wheels for said body, a bell crank for each of said wheels including a fulcrum and a pair of arms, means rotatably mounting each wheel on one arm of its associated said bell crank, means pivoting the fulcrum of each said bell crank on said body, a single connecting member for said bell cranks, means forming pivotal connections between the other arms of said bell cranks and said connecting member at the same relative spacings lengthwise of said connecting member as the corresponding spacings of said fulcrums, an adjustable connection between said connecting member and said body for causing movement of said member generally lengthwise of said body with resulting pivoting movement of said bell cranks about the axes of said wheels and generally vertical movement of said body with respect to said wheels, means on said body for locking said connecting member in a plurality of selected positions thereof, and means on one end of said connecting member forming an additional selectively usable pair of pivots for connection to the adjacent pair of said bell cranks and spaced lengthwise from said pivots for the other pair of said bell cranks by a different distance from the corresponding spacings of said fulcrums to shift the positions of said bell cranks with respect to the other pair of said bell cranks and thereby to tilt said body with respect to the ground level.

8. In a rotary lawn mower including cutting means supported in a main body casing for rotation on a substantially vertical axis, the combination of a pair of front wheels and a pair of rear wheels for said body, a bell crank for each of said wheels including a fulcrum and a pair of arms, means rotatably mounting each wheel on one arm of its associated said bell crank, means pivoting the fulcrum of each said bell crank on said body, a single connecting member for said bell cranks, means forming pivotal connections between the other arms of said bell cranks and said connecting member at the same relative spacings lengthwise of said connecting member as the corresponding spacings of said fulcrums, an adjustable connection between said connecting member and said body for causing movement of said member generally lengthwise of said body with resulting pivoting movement of said bell cranks about the axes of said wheels and generally vertical movement of said body with respect to said wheels, means on said body for locking said connecting member in a plurality of selected positions thereof, and means on the front end of said connecting member forming an additional selectively usable pair of pivots for connection to the adjacent pair of said bell cranks and spaced forwardly of said member from said pivots for the other pair of said bell cranks to shift the positions of said bell cranks with respect to the other pair of said bell cranks and thereby to raise the front end of said body with respect to the rear end of said body and the ground level.

9. In a rotary lawn mower including cutting means supported in a main body for rotation on a substantially vertical axis, the combination of a pair of front wheels and a pair of rear wheels for said body, a bell crank associated with each of said wheels, means rotatably mounting each said wheel on its associated said bell crank, means pivoting each said bell crank on said body on a pivot axis spaced from the axis of the associated said wheel, a yoke member for connecting said bell cranks including arms extending lengthwise of each side of said body and a central portion extending across the rearward end of said body, means pivotally connecting said yoke arms with said bell cranks on axes spaced from said pivot axes and said wheel axes, an operating lever for said yoke pivoted on one end of said body substantially equidistant from the adjacent said pair of wheels, means connecting said lever and said central portion of said yoke member to cause movement of said yoke member generally lengthwise of said body in response to pivoting movement of said lever with resulting pivoting movement of said bell cranks about said wheel axes and generally vertical movement of said body with respect to said wheels, and means on said body for locking said lever in a plurality of selected positions establishing a corresponding plurality of vertically adjusted positions of said cutting means with respect to the ground level.

10. In a rotary lawn mower including cutting means supported in a main body for rotation on a substantially vertical axis, the combination of a pair of front wheels and a pair of rear wheels for said body, a bell crank associated with each of said wheels, means rotatably mounting each said wheel on one end of its associated said bell crank, means pivoting each said bell crank on said body on a pivot axis intermediate the end thereof, a yoke member for connecting said bell cranks including arms extending lengthwise of each side of said body and a central portion extending across the rearward end of said body, means pivotally connecting said yoke arms with the other ends of said bell cranks, an operating lever for said yoke, means pivoting said lever on one end of said body substantially equidistant from the adjacent said pair of wheels with said lever inclined upwardly and rearwardly of said body, means connecting said lever and said central portion of said yoke member to cause movement of said yoke member generally forward and backward of said body in response to downward and upward movement of said lever respectively with resulting pivoting movement of said bell cranks about said wheel axes, and generally vertical movement of said body with respect to said wheels, and means on said body for locking said lever in a plurality of selected positions establishing a corresponding plurality of vertically adjusted positions of said cutting means with respect to the ground level.

References Cited in the file of this patent

UNITED STATES PATENTS

| | | |
|---|---|---|
| 2,263,368 | Sejkora | Nov. 18, 1941 |
| 2,720,071 | Watonabe | Oct. 11, 1955 |
| 2,730,374 | Rogers et al. | Jan. 10, 1956 |

UNITED STATES PATENT OFFICE
CERTIFICATE OF CORRECTION

Patent No. 2,848,859 August 26, 1958

Frederick Abel

It is hereby certified that error appears in the printed specification of the above numbered patent requiring correction and that the said Letters Patent should read as corrected below.

Column 6, line 38, for "the rearward" read -- one --; line 42, after "on" insert -- said --; line 64, for "the rearward" read -- one --; line 67, after "on" insert -- said --.

Signed and sealed this 24th day of March 1959.

(SEAL)
Attest:
KARL H. AXLINE
Attesting Officer

ROBERT C. WATSON
Commissioner of Patents